(12) United States Patent
Janik et al.

(10) Patent No.: US 12,048,075 B2
(45) Date of Patent: Jul. 23, 2024

(54) LIGHTING DRIVER

(71) Applicant: SIGNIFY HOLDING B.V., Eindhoven (NL)

(72) Inventors: Raymond George Janik, Fayetteville, GA (US); Russel Scott Trask, Sharpsburg, GA (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/021,193

(22) PCT Filed: Aug. 5, 2021

(86) PCT No.: PCT/EP2021/071853
§ 371 (c)(1),
(2) Date: Feb. 14, 2023

(87) PCT Pub. No.: WO2022/037954
PCT Pub. Date: Feb. 24, 2022

(65) Prior Publication Data
US 2023/0328860 A1  Oct. 12, 2023

Related U.S. Application Data

(60) Provisional application No. 63/066,658, filed on Aug. 17, 2020.

(30) Foreign Application Priority Data

Sep. 3, 2020  (EP) ..................................... 20194249

(51) Int. Cl.
*H05B 45/36* (2020.01)
*H05B 45/37* (2020.01)

(52) U.S. Cl.
CPC ............. *H05B 45/36* (2020.01); *H05B 45/37* (2020.01)

(58) Field of Classification Search
None
See application file for complete search history.

(56) References Cited

U.S. PATENT DOCUMENTS

| 2016/0254743 | A1* | 9/2016 | Han | H02M 7/04 323/205 |
| 2018/0269779 | A1 | 9/2018 | Wang et al. | |
| 2019/0097528 | A1* | 3/2019 | Wang | H02M 1/12 |

FOREIGN PATENT DOCUMENTS

| JP | S61128767 A |   | 6/1986 |
| KR | 20130024384 A | * | 3/2013 |

OTHER PUBLICATIONS

Anonymous, "Harmonic Generator (LM318)—Signal Processing—Circuit Diagram—Seek Ic.com," Jan. 28, 2013, XP55751157, Retrieved From Internet: URL: http://www.seekic.com/circuit_diagram/signal_processing/harmonic_generator_lm318.html, Retrieved on Nov. 17, 2020 (1 Page).

(Continued)

*Primary Examiner* — Anh Q Tran

(57) ABSTRACT

A lighting driver includes a negative third harmonic generator configured to generate a negative third harmonic signal corresponding to a third harmonic of an AC input voltage shifted by 180 degrees. The lighting driver further includes an adder circuit configured to generate an adder output signal by adding the negative third harmonic signal to a voltage divider output signal generated from the AC input voltage. The lighting driver also includes a controller configured to control generation of a DC output voltage provided by the lighting driver based on a control signal generated from the adder output signal.

8 Claims, 9 Drawing Sheets

(56) References Cited

OTHER PUBLICATIONS

Yoo, Jin-Wan et al., "Third Harmonic Injection Circuit To Eleminate Electrolytic Capacitors in Light-Emitting Diode Drivers," Journal of Electrical Engineering & Technology, vol. 7, No. 3, 2012 (8 Pages).

* cited by examiner

LIGHTING DRIVER

CROSS-REFERENCE TO PRIOR APPLICATIONS

This application is the U.S. National Phase application under 35 U.S.C. § 371 of International Application No. PCT/EP2021/071853, filed on Aug. 5, 2021, which claims the benefit of U.S. Provisional Patent Application No. 63/066,658, filed on Aug. 17, 2020 and European Patent Application No. 20194249.7, filed on Sep. 3, 2020. These applications are hereby incorporated by reference herein.

TECHNICAL FIELD

The present disclosure relates generally to lighting solutions, and more particularly to lighting drivers with low total harmonic distortion and high power factor performance.

BACKGROUND

A driver is often used to provide power to the light sources of a lighting device. For example, a light emitting diode (LED) driver may provide power to one or more LED light sources of one or more lighting fixtures. In general, an LED driver may receive AC (alternating-current) power (e.g., mains electricity) and generate DC (direct-current) power that is provided to one or more light sources. Some AC to DC drivers suffer from poor power factor and high current harmonic distortion at the high end of a universal input voltage, such as between 120V and 277V or above. It is generally required by regulatory agencies for input current total harmonic distortion (THD) by users not to exceed 20%. Typical lighting drivers can meet such a requirement at 120V. However, for drivers that support universal input voltage ranges, when a driver has a maximum universal input voltage of, for example, 305V, it is common for THD to rise above 20% with a corresponding drop in power factor to below 0.90. A power factor of 0.90 is often a minimum power factor requirement imposed by regulatory agencies. Violation of the THD and power factor requirements can have significant consequences. Thus, a solution that reduces THD while providing an improved power factor of lighting drivers and lighting systems may be desirable.

SUMMARY

The present disclosure relates generally to lighting solutions, and more particularly to lighting drivers with low total harmonic distortion and high power factor performance. In an example embodiment, a lighting driver includes a negative third harmonic generator configured to generate a negative third harmonic signal corresponding to a third harmonic of an AC input voltage shifted by 180 degrees. The lighting driver further includes an adder circuit configured to generate an adder output signal by adding the negative third harmonic signal to a voltage divider output signal generated from the AC input voltage. The lighting driver also includes a controller configured to control generation of a DC output voltage provided by the lighting driver based on a control signal generated from the adder output signal.

In another example embodiment, a lighting fixture includes a light source and a lighting driver that provides power to the light source. The lighting driver includes a negative third harmonic generator configured to generate a negative third harmonic signal corresponding to a third harmonic of an AC input voltage shifted by 180 degrees. The lighting driver further includes an adder circuit configured to generate an adder output signal by adding the negative third harmonic signal to a voltage divider output signal generated from the AC input voltage. The lighting driver also includes a controller configured to control, based on a control signal generated from the adder output signal, generation of a DC output voltage provided to the light source by the lighting driver.

In another example embodiment, a lighting system includes a lighting fixture and a lighting driver that provides power to the lighting fixture. The lighting driver includes a negative third harmonic generator configured to generate a negative third harmonic signal corresponding to a third harmonic of an AC input voltage shifted by 180 degrees. The lighting driver further includes an adder circuit configured to generate an adder output signal by adding the negative third harmonic signal to a voltage divider output signal generated from the AC input voltage. The lighting driver also includes a controller configured to control, based on a control signal generated from the adder output signal, generation of a DC output voltage provided to the lighting fixture by the lighting driver.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
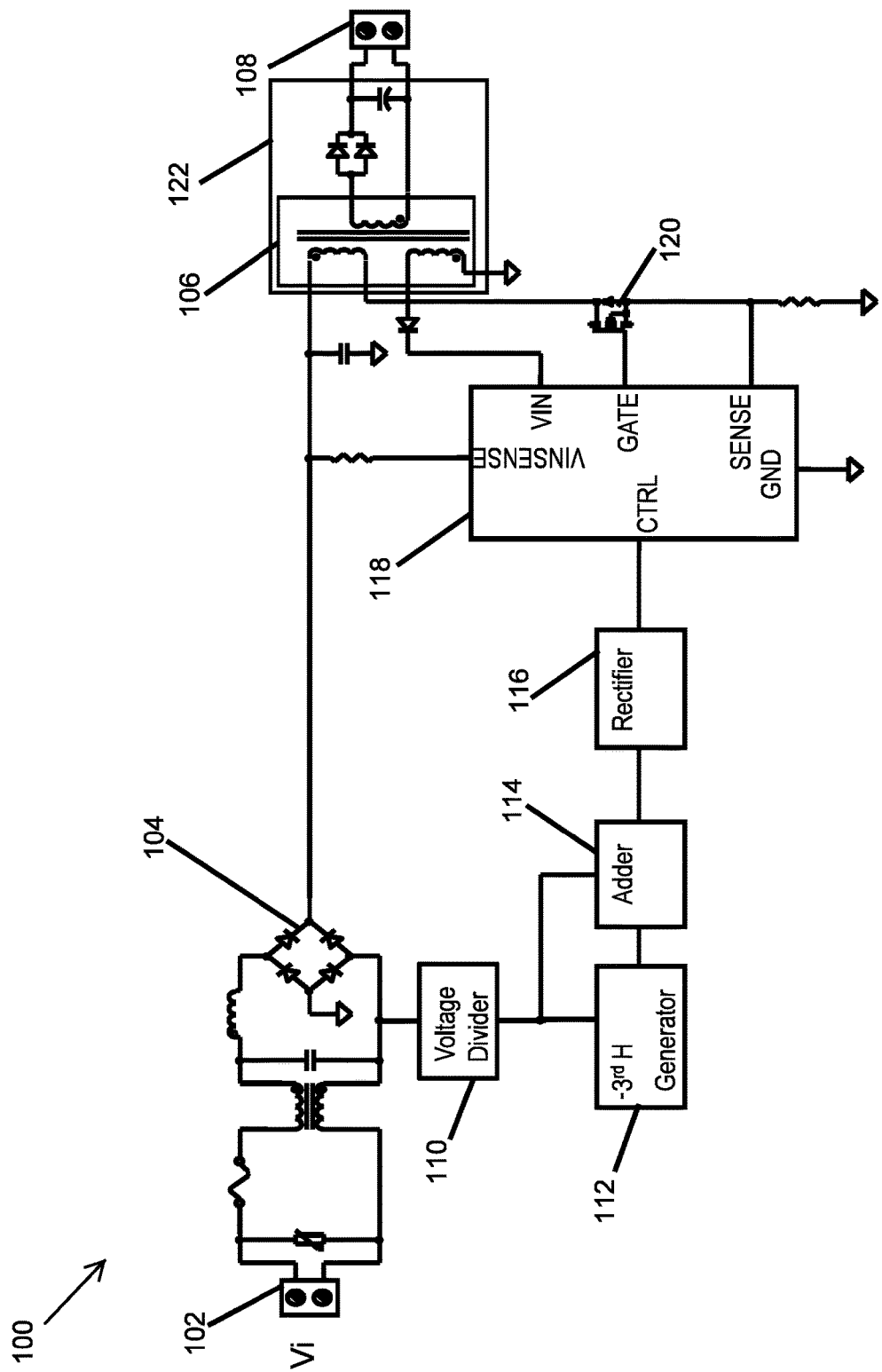
FIG. 1 illustrates a lighting driver with low total harmonic distortion and high power factor according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different drawings may designate like or corresponding, but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Some power supplies or lighting drivers sample the line voltage from a power source and align the peak switching current with the voltage to reduce total harmonic distortion and increase power factor. Such power supplies/drivers can fail to achieve desired (i.e., low) total harmonic distortion and desired (i.e., high) power factor when the line voltage is a universal input voltage, particularly near the upper limit the line voltage. One of the factors that results in increased total harmonic distortion of the line current and reduced power factor is the third harmonic (i.e., 180 Hz or 150 Hz) of the line voltage related to the operations of power supplies/drivers. In some example embodiments, the impact of the third harmonic on the total harmonic distortion and the power factor of a power supply/driver may be substantially reduced or eliminated by suppressing the third harmonic as described below.

Turning now to the figures, particular embodiments are described. FIG. 1 illustrates a lighting driver 100 with low total harmonic distortion and high power factor according to an example embodiment. In some example embodiments, the lighting driver 100 includes an input port 102 designed to be connected to an AC power source (i.e., a constant voltage source such as mains power source). The lighting driver receives a constant AC input voltage from the AC power source via the input port 102. For example, the AC power source may provide to the lighting driver 100 a universal input voltage in a range of, for example, between 120V and 277V rms or above. The lighting driver 100 also receives a current from the AC power source via through the input port 102, where the current may depend on the load powered by the lighting driver 100 as well as the components of the lighting driver 100.

In some example embodiments, the lighting driver 100 includes a rectifier circuit 104 that rectifies the input AC voltage received via the port 102. The rectifier circuit 104 may be coupled to common mode choke that is between the input port 102 and the rectifier circuit 104. The lighting driver 100 also includes an output transformer 106. The rectifier circuit 104 is coupled to the output transformer 106 and provides a rectified signal to the output transformer 106. An output unit 122 that includes the output transformer 106 generates a DC output voltage that is provided via the output port 108. For example, the output port 108 may be connected to a load (e.g., one or more lighting fixtures and/or light sources).

In some example embodiments, the lighting driver 100 may include a voltage divider 110, a negative third harmonic generator 112, an adder circuit 114, and a rectifier 116. The voltage divider 110 may be coupled to the negative third harmonic generator 112 and to the adder circuit 114. The negative third harmonic generator 112 may also be coupled to the adder circuit 114. The adder circuit 114 may be coupled to the rectifier 116. The lighting driver 100 may also include a power management controller 118. For example, the controller 118 may be LT3799 from Linear Technology-Analog Devices or another equivalent IC or system of components.

In some example embodiments, the voltage divider 110 may be coupled to receive input voltage and divide the input voltage to generate a divider output voltage that has a lower voltage level than the input voltage and that is compatible, for example, with the controller 118. The divider output voltage from the voltage divider 110 may be used to generate a negative third harmonic from the divider output voltage, which is equivalent to generating a negative third harmonic from the input voltage. The voltage divider 110 may be a resistor based voltage divider as can be readily understood by those of ordinary skill in the art with the benefit of this disclosure.

In some example embodiments, the negative third harmonic generator 112 generates a negative third harmonic (i.e., the negative of the third harmonic) of the divider output voltage. The negative third harmonic is added to the divider output voltage by the adder circuit 114 to generate an adder output. Adding the negative third harmonic to the divider output voltage using the adder circuit 114 results in a substantial removal of the third harmonic of the divider output voltage such that the adder output is substantially devoid of the third harmonic of the divider output voltage. As can be readily understood by those of ordinary skill in the art with the benefit of this disclosure, whether the third harmonic of the divider output voltage is entirely or substantially removed by the summation of the negative third harmonic to the divider output voltage depends on phase alignment as well as exact amplitude levels.

The adder output, which is generally equivalent to the divider output voltage without the third harmonic, is provided to the rectifier 116 that generates a control signal. The control signal is provided to the power management controller 118 via a control input port CTRL of the power management controller 118. The power management controller 118 regulates the output voltage provided by the lighting driver 100 at the output port 108 by controlling the switching of a transistor 120 (e.g., a transistor) that controls the operation of the output transformer 106. That is, the power management controller 118 controls the operation of the output transformer 106 based on the control signal provided to the control input port CTRL by controlling the switch 120 coupled to the output transformer 106.

Because the control signal provided to the control input port CTRL is generated after removing the third harmonic of the divider output voltage, the third harmonic of the input voltage has minimal or no impact on the switching of the switch 120, which controls the operation of the output transformer 106. Because the input current drawn by the lighting driver 100 via the input port 102 depends on the operation of the output transformer 106, the impact of the third harmonic of the input voltage on the input current is significantly reduced and the power factor of the lighting driver 100 is improved compared to lighting drivers that do not suppress the effect of the third harmonic of the input voltage.

In some example embodiments, the lighting driver 100 may include components other than shown without departing from the scope of this disclosure. In some alternative embodiments, the components of the lighting driver 100 may be coupled in a different configuration than shown without departing from the scope of this disclosure. In some alternative embodiments, the input voltage may be provided to the voltage divider 110 at a different node than shown without departing from the scope of this disclosure. In some alternative embodiments, another circuit instead of or in addition to the voltage divider 110 may be used in the generation of the control signal provided to the controller 118. In some alternative embodiments, a controller other than the controller 118 may be used to control the operation of the output amplifier 106 via the switch 120.

Figure 2:
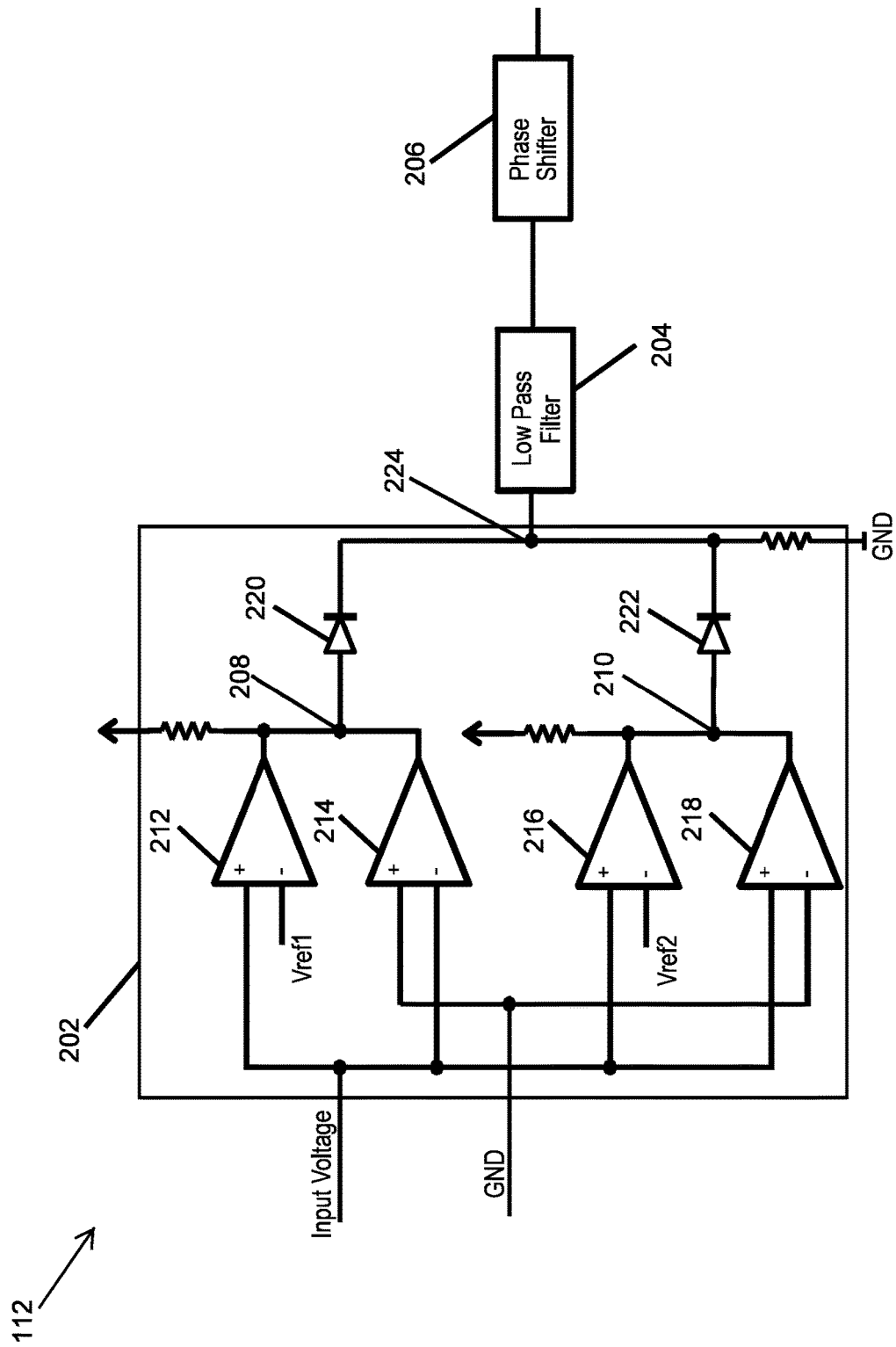
FIG. 2 illustrates a negative third harmonic generator of FIG. 1 according to an example embodiment.

FIG. 2 illustrates the negative third harmonic generator 112 of FIG. 1 according to an example embodiment. Referring to FIGS. 1 and 2, in some example embodiments, the negative third harmonic generator 112 includes a comparator circuit 202, a low pass filter 204, and a phase shifter 206. The comparator circuit 202 includes comparators 212, 214, 216, 218. The comparator circuit 202 also includes diodes 220, 222. The output ports of the comparators 212, 214 and the input port of the diode 220 are connected at a node 208, and the output ports of the comparators 216, 218 and the input port of the diode 222 are connected at a node 210.

In some example embodiments, the input voltage (i.e., the divider output voltage from the voltage divider 110 in FIG. 1) is provided an input to the comparators 212-218. A first reference voltage Vref1 is provided to the comparator 212, and a second reference voltage Vref2 is provided to the comparator 216. An input port of each of the comparators 214, 218 are connected to ground. Thus, the comparator 212 generates an output based on the comparison of the input voltage to the reference voltage Vref1, the comparator 216 generates an output based on the comparison of the input voltage to the reference voltage Vref2, and the comparators 214, 218 generate a respective output based on the comparison of the input voltage to ground.

Figure 3:
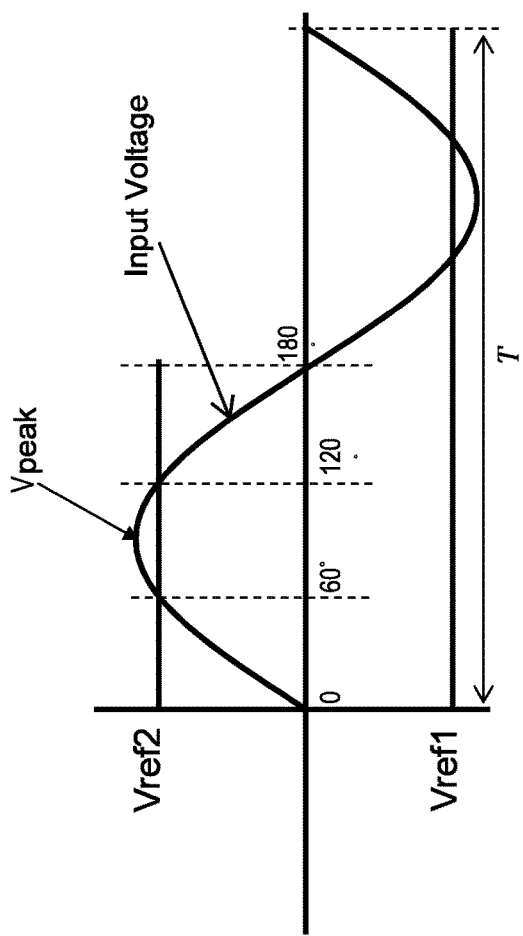
FIG. 3 illustrates the relationship between the input voltage and reference voltages used in generating a negative third harmonic signal by the negative third harmonic generator of FIG. 2 according to an example embodiment.

FIG. 3 illustrates the relationship between the input voltage and reference voltages Vref1 and Vref2 used in generating a negative third harmonic signal by the negative third harmonic generator 112 of FIG. 2 according to an example embodiment. Referring to FIGS. 1-3, in some example embodiments, the reference voltage Vref2 intersects the input voltage at 60 degrees and 120 degrees in a cycle of the input voltage level having a period T as shown in FIG. 3. Also as shown in FIG. 3, the reference voltage Vref1 intersects the input voltage at 240 degrees and 300 degrees in the cycle of the input voltage level. In general, reference voltage Vref1 is at a voltage level of −0.866 of the peak voltage level of the input voltage, and the reference voltage Vref2 is at voltage level of 0.866 of the peak voltage level. The output ports of the diodes 220, 222 of the comparator circuit of FIG. 2 are connected at a node 224 coupled to the low pass filter 204.

Figure 4:
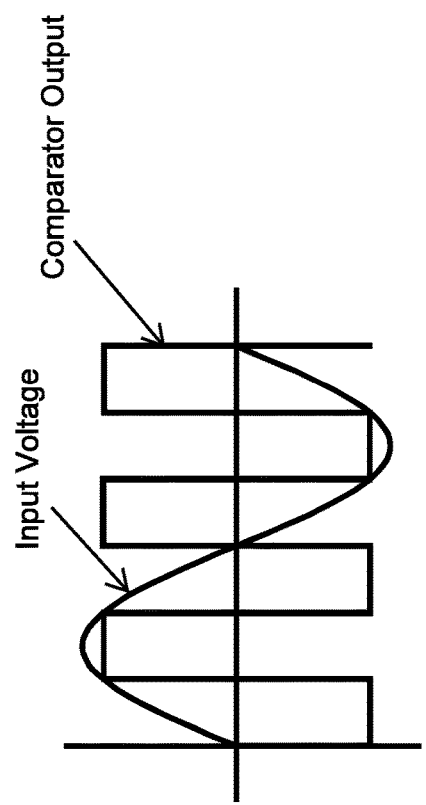
FIG. 4 illustrates a comparator output voltage generated by the comparator circuit 202 of the negative third harmonic generator of FIG. 2 and the voltage divider output corresponding to the input voltage provided to the lighting driver of FIG. 1 according to an example embodiment.
Figure 5A:
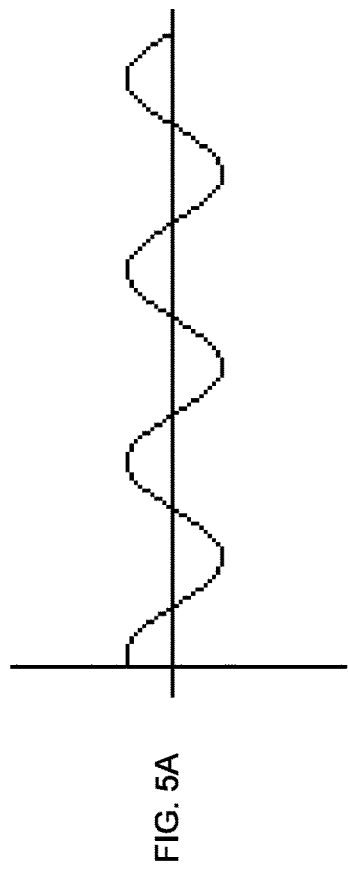
FIG. 5A illustrates a waveform of a filtered output signal generated by a low pass filter of the third harmonic generator of FIG. 2 according to an example embodiment.

FIG. 4 illustrates a comparator output voltage generated by the comparator circuit 202 of the negative third harmonic generator 112 of FIG. 2 and the divider output voltage corresponding to the input voltage provided to the lighting driver 100 of FIG. 1 according to an example embodiment. FIG. 5A illustrates a waveform of a filtered output signal generated by the low pass filter 204 of the negative third harmonic generator 112 of FIG. 2 according to an example embodiment. Referring to FIGS. 1-5A, in some example embodiments, the low pass filter 204 of FIG. 2 filters the comparator output voltage from the comparator circuit 202 and generates the filtered output voltage shown in FIG. 5A. In general, the filtered output voltage from the low pass filter 204 is a phase shifted version of the negative third harmonic of the divider output voltage provided by the voltage divider 110. As described above, the divider output voltage is generated from the input voltage provided to the lighting driver 100 as shown in FIG. 1.

In some example embodiments, the filtered output voltage from the low pass filter 204 is provided to the phase shifter 206. The phase shifter 206 is designed to shift the phase of the filtered output voltage and generate a phase shifted output voltage. In general, the phase shifter 206 may introduce a phase shift to the filtered output voltage from the low pass filer 204 such that the phase shifted output voltage is 180 degrees shifted from the third harmonic of the divider output voltage. That is, the phase shifted output voltage generated/provided by the phase shifter 206 is a negative (i.e., 180 degrees shifted) of the third harmonic of the divider output voltage from the voltage divider 110. The amount of required phase shift may be determined from measurement or by calculation based on particular elements of the negative third harmonic generator 112 as can be readily understood by those of ordinary skill in the art with the benefit of this disclosure. The amplitude of the phase shifted output voltage may also be set based on the amplitude of the divider output voltage as can be readily understood by those of ordinary skill in the art with the benefit of this disclosure.

Figure 5B:
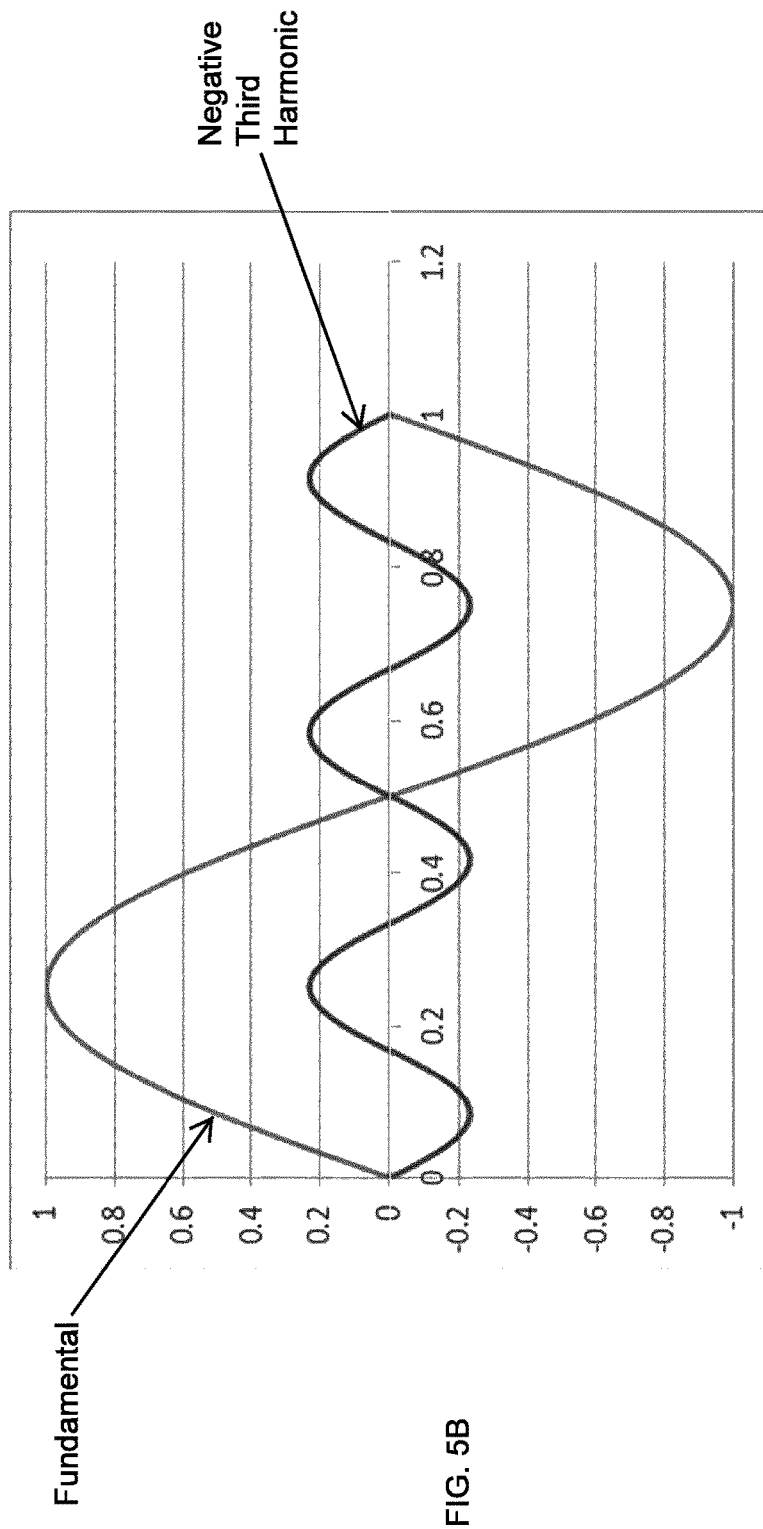
FIG. 5B illustrates the relationship between the fundamental component of the input voltage and the negative third harmonic signal generated by the third harmonic generator of FIG. 2 according to an example embodiment.

The phase shifted output voltage is the output voltage of the negative third harmonic generator 112 that is provided to the adder 114 of the lighting driver 100 of FIG. 1. FIG. 5B shows the relationship between the fundamental component of the divider output voltage, which is equivalent to the fundamental component of the input voltage provided to the lighting driver 100, and the negative third harmonic generated by the third harmonic generator of FIG. 2 according to an example embodiment.

In general, the phase shifter 206 of FIG. 2 may be implemented in a number of ways as can be readily understood by those of ordinary skill in the art with the benefit of this disclosure. For example, the phase shifter 206 may include an operational amplifier based circuit. In some example embodiments, the phase shifter 206 may include an all-pass filter that introduces a desired phase shift as can be readily understood by those of ordinary skill in the art with the benefit of this disclosure.

In some alternative embodiments, the negative third harmonic generator 112 may include other components without departing from the scope of this disclosure. In some alternative embodiments, the components of the negative third harmonic generator 112 may be coupled in a different configuration than shown without departing from the scope of this disclosure. In some alternative embodiments, some of the components of the negative third harmonic generator 112 may be integrated into a single component. For example, the functions of the low pass filter 204 and the phase shifter 206 may be integrated a single component. In some alternative embodiments, the function of the comparator circuit 202 may be implemented with different components than shown without departing from the scope of this disclosure.

Figure 6:
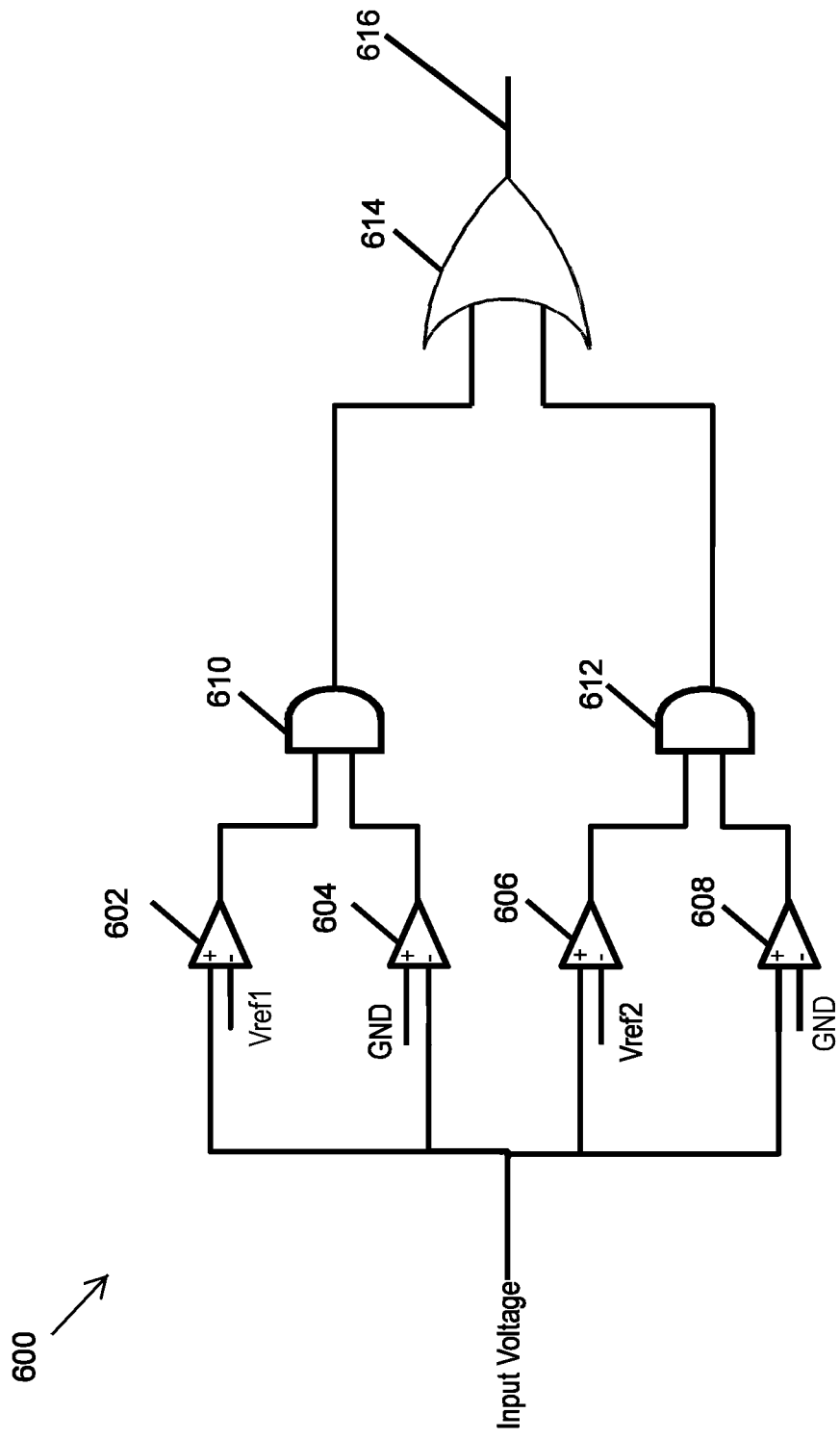
FIG. 6 illustrates a comparator circuit for use in the negative third harmonic generator of FIG. 1 according to another example embodiment.

FIG. 6 illustrates a comparator circuit 600 for use in the negative third harmonic generator 112 of FIG. 1 according to another example embodiment. For example, the comparator circuit 600 may be used instead of the comparator circuit 202 of FIG. 2. Referring to FIGS. 1-6, in some example embodiments, the comparator circuit 300 includes comparators 602-608, AND logic gates 610, 612, and an OR logic gate 614. The input voltage corresponding to the divider output voltage from the voltage divider 110 is provided to the comparators 602-608. The first reference voltage Vref1 is provided to comparator 602, the second reference voltage Vref2 is provided to comparator 606, and a respective input of the comparators 604, 608 are coupled to ground. The reference voltages Vref1 and Vref2 are described above with respect to FIG. 3. The outputs of the comparators 602, 604 are provided to the AND gate 610, and the outputs of the comparators 606, 608 are provided to the AND gate 612. The outputs of the AND gates 610, 612 are provided to the OR gate 614 that generates the comparator output voltage on the connection 616.

In general, the waveform labelled comparator output in FIG. 4 represents the comparator output voltage on the connection 616. The connection 616 may be coupled to the low pass filter 204 of FIG. 2, and the low pass filter 204 may filter the comparator output voltage to generate the filtered output voltage that is provided to the phase shifter 206 as described above.

In some alternative embodiments, the comparator circuit 600 may include other components without departing from the scope of this disclosure. In some alternative embodiments, the some of the components of the comparator circuit 600 may be integrated into a single component without departing from the scope of this disclosure. In some alternative embodiments, different logic gates than shown may be used to limit the function of the comparator circuit 600 without departing from the scope of this disclosure.

Figure 7:
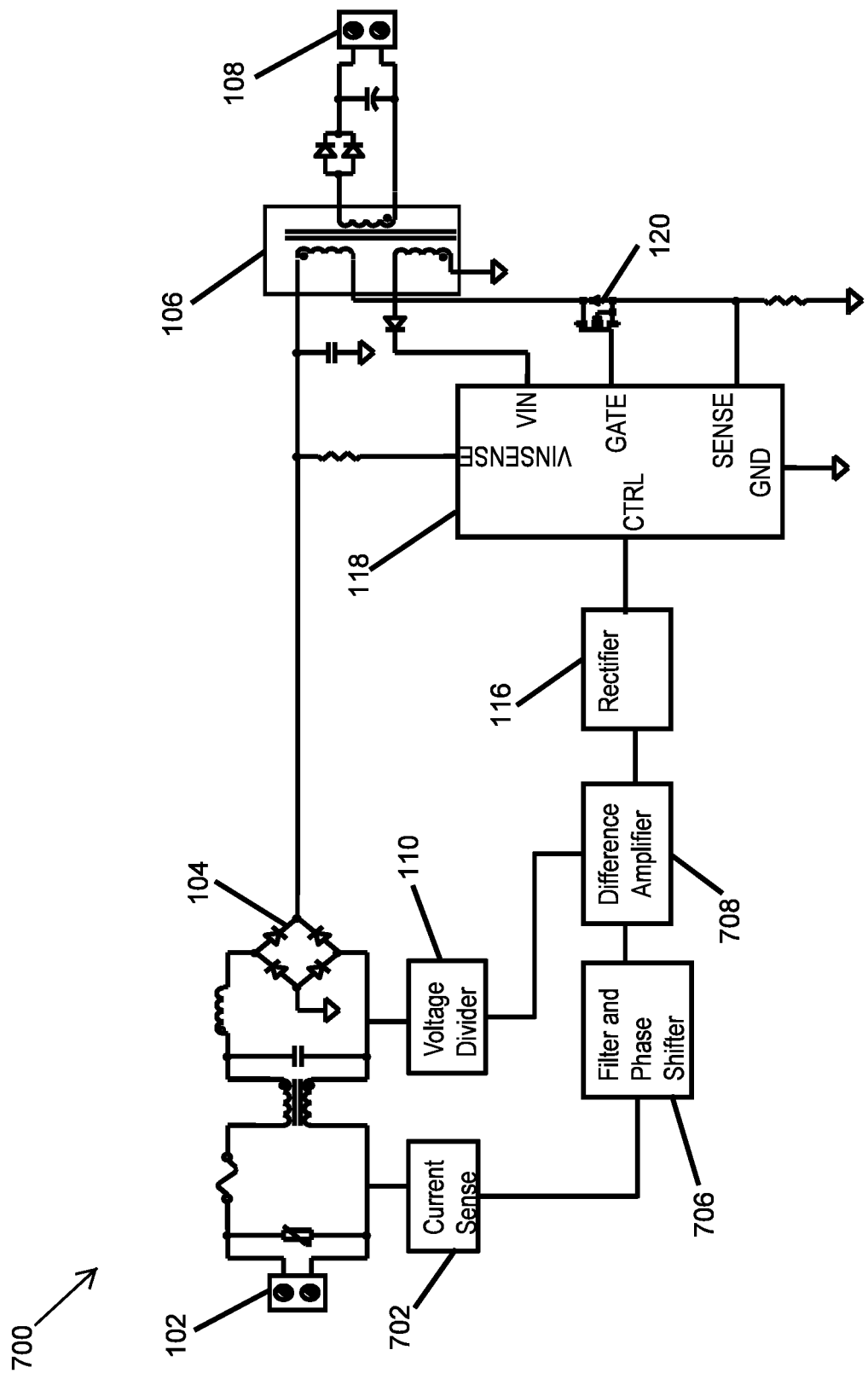
FIG. 7 illustrates a lighting driver with low total harmonic distortion and high power factor according to another example embodiment.

FIG. 7 illustrates a lighting driver 700 with low total harmonic distortion and high power factor according to another example embodiment. In some example embodiments, the lighting driver 700 includes the same components described above with respect to the lighting driver 100 of FIG. 1. To illustrate, in some example embodiments, the lighting driver 700 includes the input port 102, the rectifier circuit 104, the output transformer 106, and the output port 108. The lighting driver 700 may also include a current sense circuit 702, the voltage divider 110, a filter and phase shifter circuit 706, a difference amplifier 708, and the rectifier 116. The lighting driver 700 may also include the power management controller 118. The rectifier circuit 104 is coupled to the output transformer 106 and provides the rectified input voltage to the output transformer 106. The voltage divider 110 may be coupled to generate a divider output voltage as described with respect to FIG. 1. The voltage divider 110 is coupled to and provides the divider output voltage to the difference amplifier 708.

In some example embodiments, the current sense circuit 702 is coupled to sense the current from the AC power source and to generate a representative current sense output signal that is provided to the filter and phase shifter circuit 706. The filter and phase shifter circuit 706 is coupled to the difference amplifier 708 that generates a difference output signal representing the difference between the divider output voltage and the output voltage from the filter and phase shifter circuit 706. The difference amplifier 708 is coupled to the rectifier 116 that is coupled to the controller 118 and that provides a control signal to the control input port CTRL port of the controller 118. The controller 118 controls the switch 120 and thus the output transformer 106 based on the control signal in a similar manner as described above with respect to FIG. 1.

In some example embodiments, the filter and phase shifter circuit 706 may include a band pass filter that passes a range of frequency components of the current sense output signal from the current sense circuit 702 and filters out/rejects other frequency components of the current sense output signal. In general, the band pass filter may reject at least the fundamental harmonic of the current sense output signal and pass at least the third harmonic of the current sense output signal. An example band pass filter 800 that may be included in the filter and phase shifter circuit 706 is shown in FIG. 8.

Figure 8:
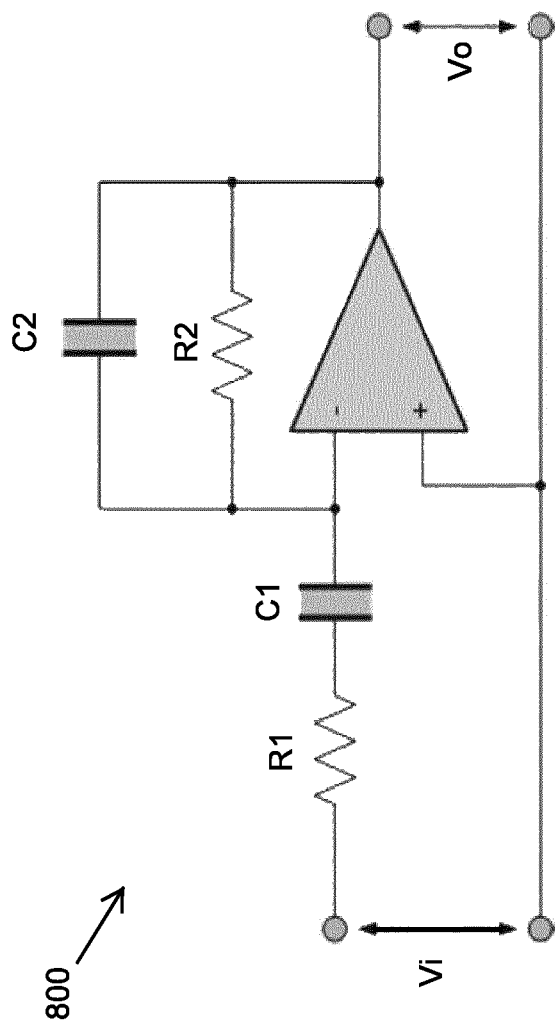
FIG. 8 illustrates a low pass filter according to another example embodiment.

Referring to FIGS. 7 and 8, in some example embodiments, the values of resistors R1, R2 and capacitors C1, C2 of the band pass filter 800 may be selected to pass the third harmonic, the fifth harmonic, and the seventh harmonic of the current sense output signal from the current sense circuit 702 and substantially filter out/reject other frequencies. For example, for a 60 Hz AC input power provided to the lighting driver 700, the band pass filter 800 may substantially reject frequency components below 120 Hz and above 420 Hz. In some alternative embodiments, the band pass filter 800 may pass the third harmonic and the fifth harmonic and reject harmonics that are below the third harmonic and above the fifth harmonic. In some alternative embodiments, instead of a band pass filter, the filter and phase shifter circuit 706 may include a high pass filter that passes frequencies corresponding to the third and higher harmonics of the current sense output signal while rejecting frequencies below the frequency corresponding to the third harmonic.

In some example embodiments, the filter and phase shifter circuit 706 includes a phase shifter that shifts the phase of the filtered output voltage from the filter circuit of the filter and phase shifter circuit 706. For example, the phase shifter may be an all-pass filter that shifts the phase of the filtered output voltage from the band pass filter 800 to align the harmonics that pass through the filter 800 with the corresponding harmonics of the divider output voltage. The amount of phase shifting required may be determined from measurement or by calculation based on particular elements of the filter 800 and other relevant elements of the lighting driver 100 as can be readily understood by those of ordinary skill in the art with the benefit of this disclosure.

In some example embodiments, the difference amplifier 708 generates the difference output signal representing the difference between the divider output voltage and the output voltage from the filter and phase shifter circuit 706. Because the output signal from the filter and phase shifter circuit 706 includes at least the phase-shifted third harmonic of the current sense output signal from the current sensor 702, the difference output signal generated by the difference amplifier 708 does not include the third harmonic of the divider output voltage provided to the difference amplifier 708. The difference output signal generated by the difference amplifier 708 is provided to the rectifier 116 that rectifies the difference output signal and generates a control signal to the control input port CTRL port of the controller 118. As described above, the controller 118 controls the switching of the switch 120 based on the control signal, and the operation of the output transformer 106 depends on the switching of the switch 120. Because the third harmonic of the divider output voltage generated by the voltage divider 110 is removed before generating the control signal provided to the controller 118, the impact of the third harmonic of the divider output voltage (and thus, impact of the third harmonic of the input voltage provided to the lighting driver 100) on the total harmonic distortion of the input current drawn by the lighting driver 100 from the AC power source is significantly reduced.

In some example embodiments, the lighting driver 700 may include other components without departing from the scope of this disclosure. In some alternative embodiments, the voltage divider 110 and the current sense circuit 702 may be coupled at different nodes than shown without departing from the scope of this disclosure. In some alternative embodiments, the components of the lighting driver 700 may be coupled in a different configuration than shown without departing from the scope of this disclosure. In some alternative embodiments, another circuit instead of or in addition to the voltage divider 110 may be used in the generation of the control signal provided to the controller 118. In some alternative embodiments, a controller other than the controller 118 may be used to control the operation of the output amplifier 106 via the switch 120.

Figure 9:
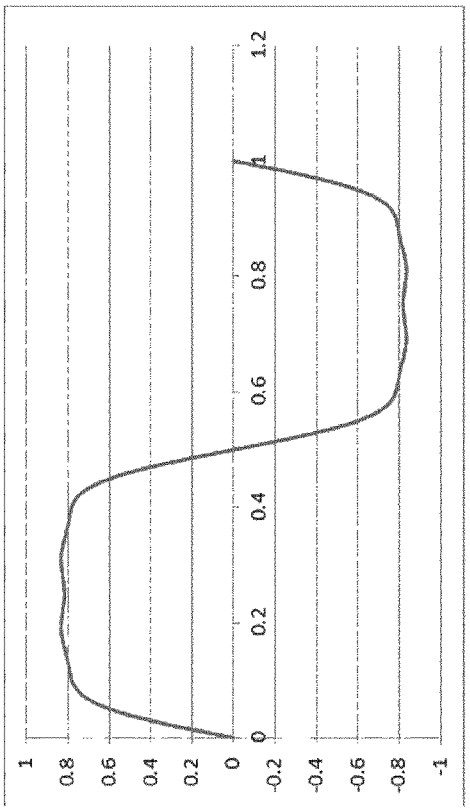
FIG. 9 is a graph illustrating a waveform of an input current with high total harmonic distortion.

FIG. 9 is a graph illustrating a waveform of an input current with high total harmonic distortion. For example, the total harmonic distortion of the input current, such as the input current received via the input port 102 of the lighting drivers 100, 700, may be approximately 35%, which is extremely high. In some example embodiments, the significant contributor to the high total harmonic distortion of the input current of the input current is the third harmonic of the input voltage.

Figure 10:
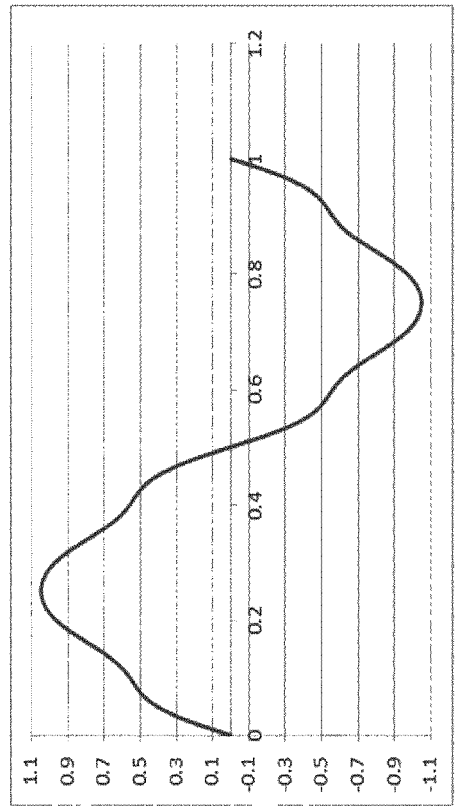
FIG. 10 is a graph illustrating an example waveform of an input current with relatively low total harmonic distortion when using the lighting drivers of FIGS. 1 and 7.

FIG. 10 is a graph illustrating a waveform of an input current with relatively low total harmonic distortion when using the lighting drivers 100, 700 of FIGS. 1 and 7 according to an example embodiment. By eliminating or reducing the effect of the third harmonic of the input voltage (by eliminating or reducing the third harmonic of the divider voltage output generated from the input voltage) on the operation of the output transformer 106, the unwanted impact of the third harmonic of the input voltage on the total harmonic distortion of the input current is eliminated or significantly reduced. For example, the total harmonic distortion of the input current represented by the waveform shown in FIG. 10 may be approximately 8%, which is a significant improvement over the 35% total harmonic distortion of the input current shown in FIG. 9.

Figure 11:
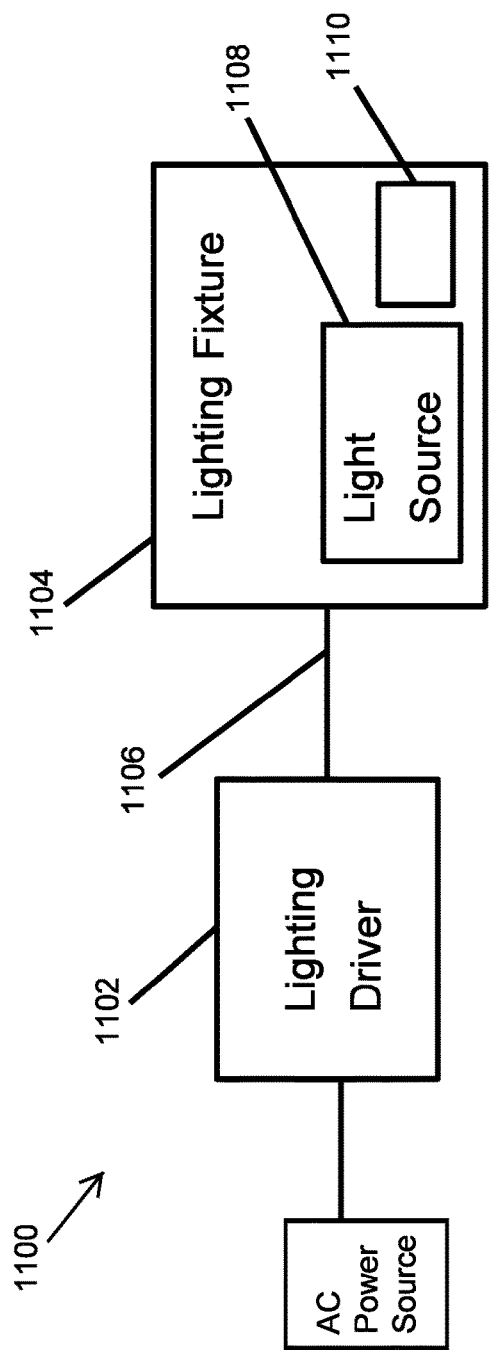
FIG. 11 illustrates a lighting system including a lighting driver according to an example embodiment.

FIG. 11 illustrates a lighting system 1100 including a lighting driver 1102 according to an example embodiment. For example, the lighting driver 1102 may correspond to the lighting driver 100 of FIG. 1 or the lighting driver 700 of FIG. 7. An AC power source (e.g., a power source of a power generation or distribution company) may provide AC power to the lighting driver 1102.

In some example embodiments, the lighting system 1100 may include a lighting fixture 1104, and the lighting driver 1102 may provide power to the lighting fixture 1104. For example, the lighting driver 1102 may provide DC power (e.g., DC in a range of 12V-24V) to the lighting fixture 1104. In some example embodiments, the lighting fixture 1104 may include a light source 1108 (e.g., a light emitting diode (LED) light source or another type of light source) that provides illumination light and/or other light (e.g., indicator light). The lighting fixture 1104 may be an indoor or outdoor lighting fixture. In some example embodiments, the lighting fixture 1104 may also include one or more other components 1110, such as a sensor, a camera, etc., that may be powered by the lighting driver 1102.

By using the lighting driver 1102, which suppresses the third harmonic of the input voltage provided by AC power source, the total harmonic distortion of the input current provided by the AC power source is reduced and the power factor of the lighting driver 1102 is improved compared to lighting drivers that do not suppress the impact of the third harmonic of the input voltage.

In some alternative embodiments, the lighting system 1100 may include other components without departing from the scope of this disclosure. For example, the lighting system 1100 may include other lighting fixtures that are powered by the lighting driver 1102. In some alternative embodiments, the lighting fixture 1104 may include other components than shown without departing from the scope of this disclosure.

Figure 12:
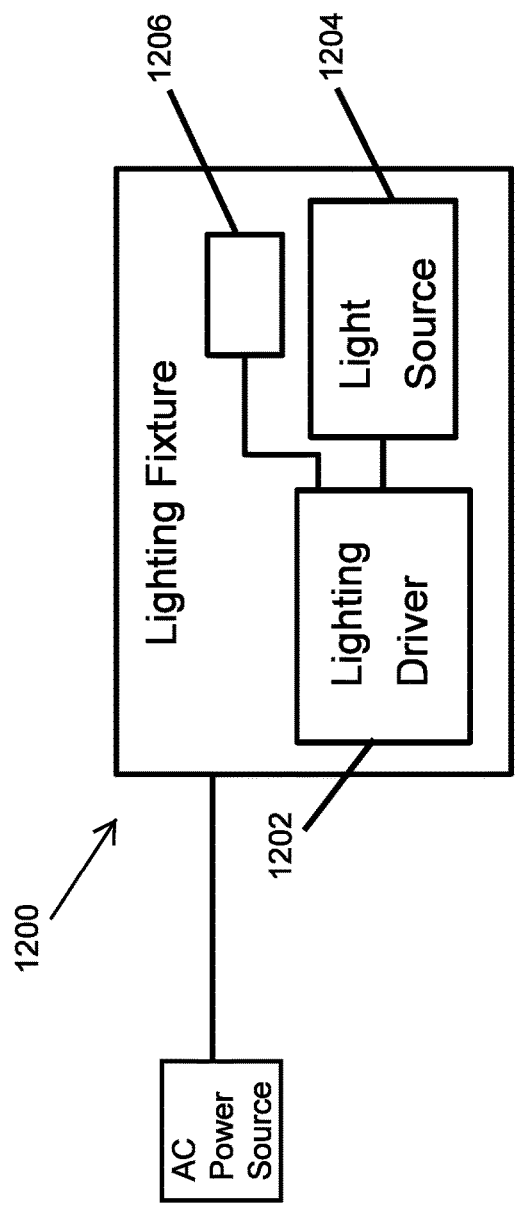
FIG. 12 illustrates a lighting fixture including a lighting driver according to an example embodiment.

FIG. 12 illustrates a lighting fixture 1200 including a lighting driver 1202 according to an example embodiment. For example, the lighting driver 1202 may correspond to the lighting driver 100 of FIG. 1 or the lighting driver 700 of FIG. 7. An AC power source (e.g., a power source of a power generation or distribution company) may provide AC power to the lighting fixture 1200. The lighting driver 1202 may generate DC power (e.g., DC in a range of 12V-24V) from the AC power and provide the DC power to a light source 1204 of the lighting fixture 1200. The light source 1204 (e.g., a light emitting diode (LED) light source or another type of light source) may provide illumination light and/or other light (e.g., indicator light).

In some example embodiments, the lighting driver 1202 may also provide DC power generated from the AC power to one or more other components 1206 (e.g., sensors, camera, etc.) of the lighting fixture 1200. The lighting fixture 1200 may be an indoor or outdoor lighting fixture.

By using the lighting driver 1202, which suppresses the third harmonic of the input voltage provided by AC power source, the total harmonic distortion of the input current provided by the AC power source is reduced, and the power factor of the lighting driver 1202 is improved compared to lighting drivers that do not suppress the impact of the third harmonic of the input voltage.

In some alternative embodiments, the lighting fixture 1200 may include other components than shown without departing from the scope of this disclosure. In some alternative embodiments, the lighting driver 1202 may provide power to components that are external to the lighting fixture 1200 without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the scope of the following claims, the scope of which are to be accorded the broadest interpretation so as to encompass modifications and equivalent structures.

The invention claimed is:

1. A lighting driver comprising:
  a negative third harmonic generator configured to generate a negative third harmonic signal corresponding to a third harmonic of an AC input voltage shifted by 180 degrees, wherein the negative third harmonic generator comprises a comparator circuit, a low pass filter, and a phase shifter wherein the low pass filter generates a filtered output signal from an output signal of the comparator, and wherein the phase shifter shifts the generated negative third harmonic signal to compensate for the phase shift of the low pass filter
  an adder circuit configured to generate an adder output signal by adding the negative third harmonic signal to a voltage divider output signal generated from the AC input voltage; and a controller configured to control generation of a DC output voltage provided by the lighting driver based on a control signal generated from the adder output signal.

2. The lighting driver of claim 1, further comprising a rectifier that rectifies the adder output signal to generate the control signal.

3. The lighting driver of claim 1, wherein the voltage divider output signal is generated by a voltage divider circuit.

4. The lighting driver of claim 1, further comprising an output unit comprising an output transformer and wherein the controller controls the output transformer.

5. The lighting driver of claim 4, further comprising a rectifier circuit that generates a rectified voltage provided to the output transformer, wherein the rectified voltage is generated from the AC input voltage.

6. The lighting driver of claim 1, wherein the comparator circuit comprises comparators that compare the voltage divider output signal to reference voltages and to ground voltage level to generate the output signal of the comparator circuit.

7. The lighting driver of claim 6, wherein a first reference voltage of the reference voltages matches a first voltage level of the voltage divider output signal at a 60-degree phase of the voltage divider output signal, and wherein a second reference voltage of the reference voltages matches a second voltage level of the voltage divider output signal at a 240-degree phase of the voltage divider output signal.

8. The lighting driver of claim 1, wherein the lighting driver further comprises an output unit comprising an output transformer and wherein the controller controls the output transformer.

* * * * *